Feb. 4, 1936. R. W. EARLE 2,029,863
CHROMOSCOPE
Filed March 24, 1933 2 Sheets-Sheet 2

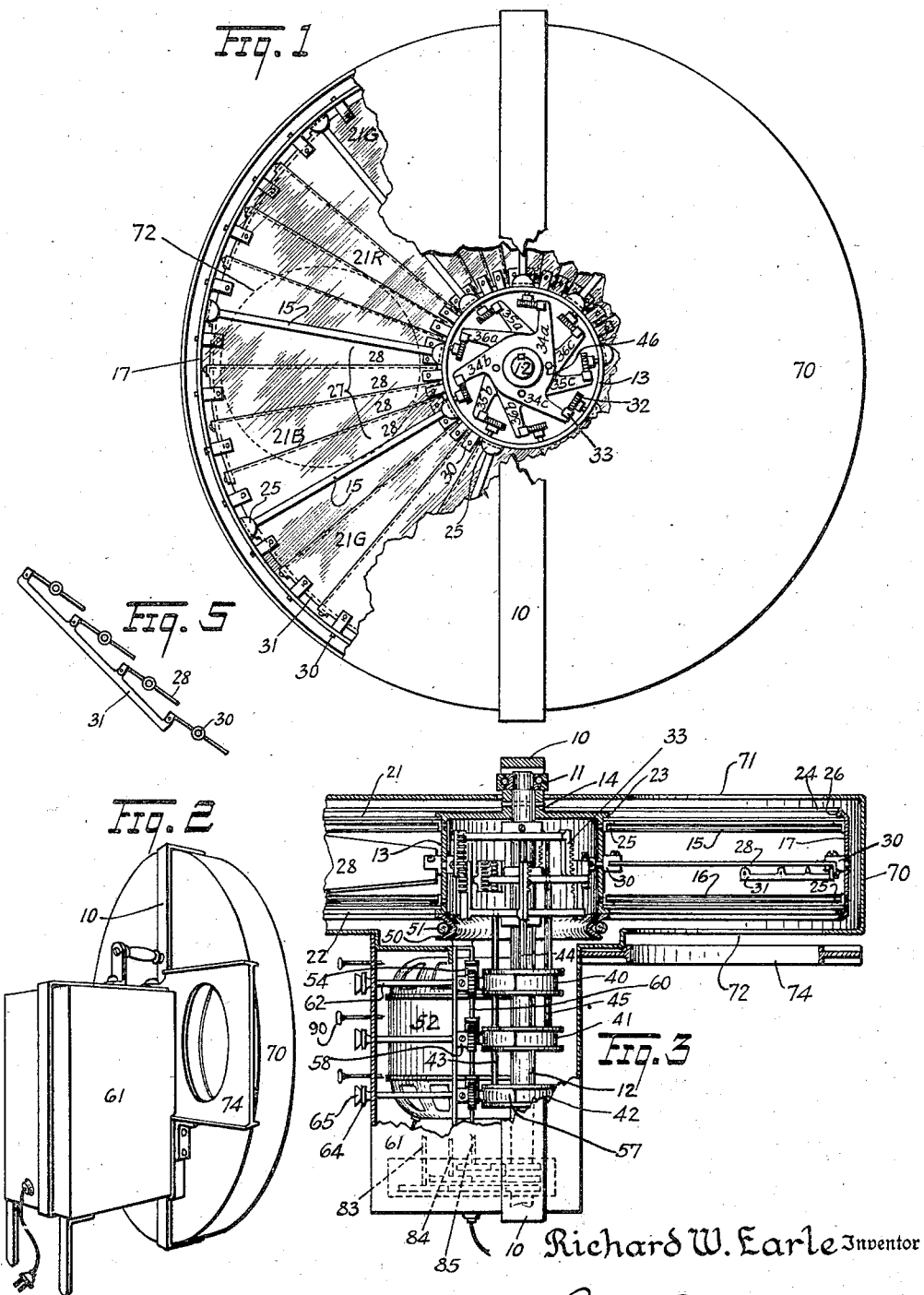

Richard W. Earle Inventor

Attorneys

Patented Feb. 4, 1936

2,029,863

UNITED STATES PATENT OFFICE 2,029,863

CHROMOSCOPE

Richard W. Earle, Los Angeles, Calif.

Application March 24, 1933, Serial No. 662,442

21 Claims. (Cl. 240—3.1)

This invention relates to a color screen mechanism for the projected rays of an illuminating device, employed for theatrical, advertising, or analogous purposes; and it utilizes the well known phenomenon of an admixture or composite color projection produced by the chromatic composition of differently colored transparencies passed rapidly and repeatedly across the rays of light.

The main object of the invention is to produce a screen of the aforesaid nature in which the color projection of the light rays may be varied to any desired selective admixture or chromatic composition of the component colors of the several screen transparencies.

Another main object is to provide means for determinedly selectively varying such color admixture or chromatic composition during continuous illuminating projection.

Another object is to provide for automatic operation, when desired, of the chromatic control means to effect variations of recurrent progression of the chromatic colors projected.

Another object is to provide a housing in which the colored transparencies and their chromatic control means may travel with a minimum of air resistance and freedom from disturbance of the nicety of such control adjustment.

With the above objects outlined, and with others that will appear later herein, the invention comprises the improved screen mechanism and operative control means therefor more fully described in connection with the accompanying drawings, the novel features thereof being specifically set forth in the appended claims.

In the drawings:

Figure 1 is a front view of the chromoscope, parts being broken away to illustrate details of construction;

Figure 2 is a rear perspective view of the chromoscope;

Figure 3 is a plan view, partly broken away and partly in section to show the construction;

Figure 5 is a developed plan view of several shutters and the connecting link therefor.

Figure 4:
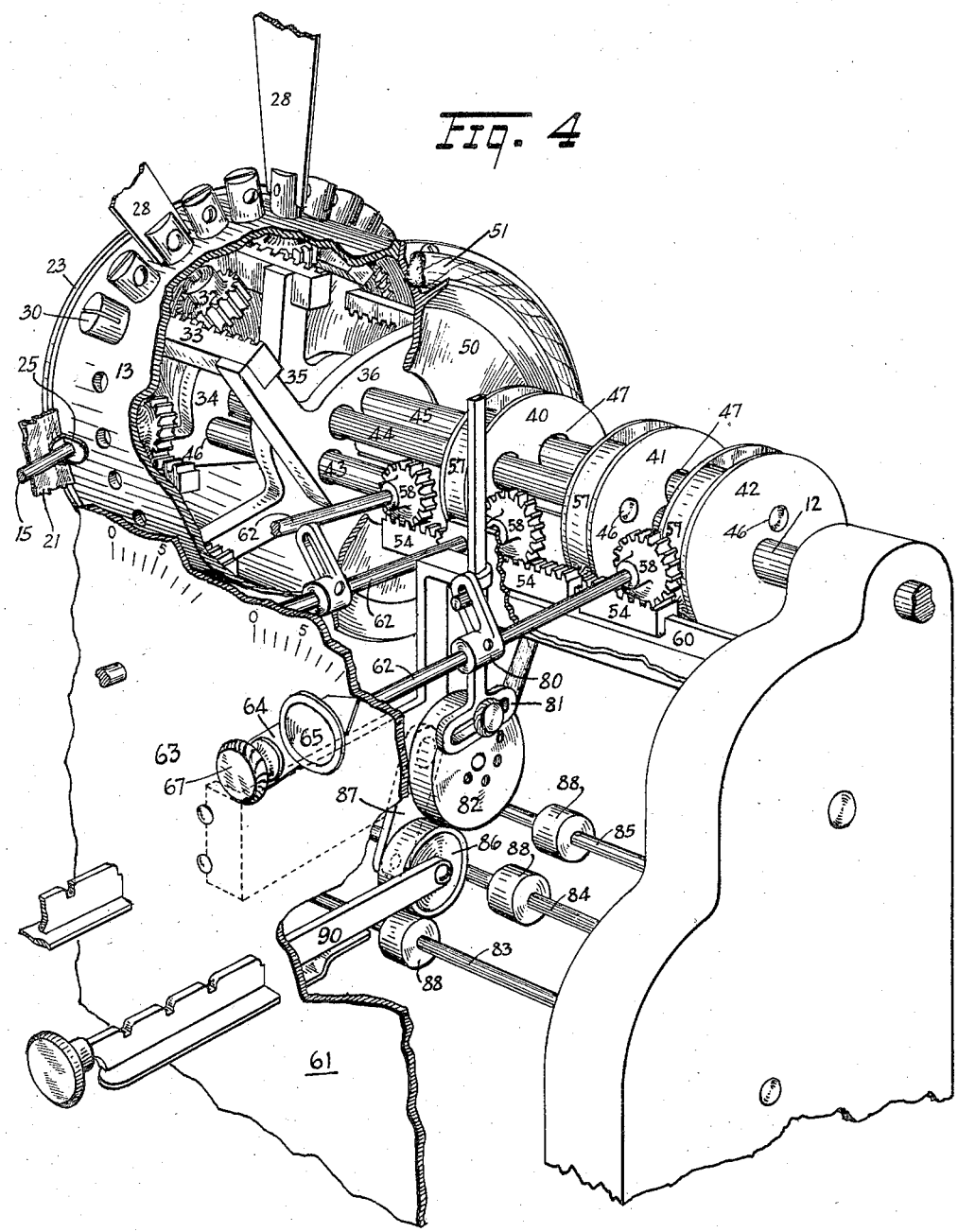
Figure 4 is an enlarged perspective view of part of the shutter control mechanism.

Referring particularly to Figures 1 and 3 the numeral 10 designates an irregularly bent strap-frame provided with suitable alined bearings 11 for a rotary shaft 12. A hollow cylindrical hub 13 has a reduced portion 14 by which it is conveniently secured to shaft 12 and supports a plurality of rods 15 and 16 equally spaced in alined pairs about its periphery. The outer ends of the rods are secured to a circular band or rim 17 which with hub 13 defines an annular chamber divided by the rods into a plurality of equal segmental sections.

Each segmental section of the annular chamber is closed at one side by a colored transparency, such as a colored glass 21, and at its other side by a non-colored transparency, such as a clear glass 22. If desired, a single glass disc with a central opening to accommodate hub 13 may be employed in place of a plurality of segmental clear glasses 22. The glasses 21, 22 are retained between flanges or beads 23 and 24 on the hub and rim, respectively, and angle-supports 25 secured to the hub and rim, as by the rods 15 and 16. Spring retaining rings 26 may, if desired, be utilized between the flanges and the glasses to hold the latter against the angled supports 25.

Between each colored glass 21 and the clear glass 22 is a group 27 of four shutters 28 arranged to be pivotally adjusted to determinedly vary the quantity of light which is projected through the related colored glasses. The shutters 28 comprise thin segmental plates (preferably blackened) provided with mounting-trunnions 30 journalled in hub 13 and rim 17 so that they may be turned to any position from fully open to fully closed, in which latter position the shutters of each group are substantially parallel to the planes of glasses 21 and 22 and overlap slightly to preclude passage of a beam of light through the related colored glass. In the fully open position each shutter 28 is disposed in a plane extending substantially along the axis of shaft 12, that is substantially perpendicular to the planes of glasses 21, 22, so that a minimum obstruction is presented to passage of a beam of light since the shutters are disposed edge-wise thereof. Adjacent one edge at their upper ends all of the shutters of a group 27 are operatively inter-connected by a link 31 (Fig. 5) so that adjustment of one shutter 28 of any group 27 effects corresponding and simultaneous adjustment of all other shutters of the group.

According to my invention transparent glasses 21 of three different colors are employed and they are so arranged that any particular color is repeated in every third section. For example, as designated in Fig. 1 the glasses 21R may be red or red-orange, the glasses 21B blue or blue-violet and the glasses 21G may be green or blue-green.

It is desirable when adjusting the shutter group 27 corresponding to any glass of one color to effect a similar adjustment of the shutter groups for other glasses of like color. Therefore, the lower trunnion 30 of one shutter of each group extends into hub 13 and has fixed thereto a pinion 32. The pinions 32 mesh with sliding racks 33 for turnably adjusting the related groups of shutters. The racks 33 are secured to and extend angularly from the arms of three spiders 34, 35, 36, respectively, keyed to shaft 12 for rotation therewith but also movable axially therealong. Each spider has three arms 34a, b, c; 35a, b, c etc. angularly disposed so that their associated racks 33 mesh with pinions 32 of groups of shutters corresponding to glasses of like color. For compactness the racks 33 on the spiders 35 and 36, respectively extend in one direction from their spiders and the racks on spider 34 extend in the opposite direction between the racks of spiders 35 and 36 so that the racks are nested to reduce the space required therefor.

Keyed for rotation with, but slidable on shaft 12, are three grooved collars 40, 41, 42 corresponding respectively to spiders 34, 35 and 36 and individually connected thereto by rods 43, 44, and 45 secured in apertures 46 in the collars and spiders. A pulley 50 fixed to shaft 12 is connected by a belt 51 to the drive pulley of a motor 52, mounted on frame 10, for driving shaft 12 and rotating the above described color screen. Collars 40, 41, pulley 50 and spiders 35, 36 are provided with spaced apertures 47 to permit the rods 43—45 to extend therethrough from the collars at the right to their spiders, as is illustrated in Figure 4.

In order that collars 40—42, and hence spiders 34—36, may be slidably operated to desirably adjust the positions of the various groups of shutters without stopping rotation of the color screen the following mechanism is provided: Racks 54, individual to collars 40, 41 and 42 are each provided with a bifurcated saddle 57 seating in the grooves of the collars so that upon rotation of pinions 58 meshing with the racks 54 the latter are moved along suitable guides 60 supported from a housing 61 which also encloses motor 52. The pinions 58 are fixed to shafts 62 journalled in the hangers for guide 60 and extending through the wall 63 of housing 61. Each shaft has an operating arm or pointer 64 loosely mounted on squared portions thereof and provided with a finger cup 65 by which the shafts 62 may be turned to selectively actuate the racks 54 and effect proportionate sliding movement of the collars 40—42 along shaft 12, thereby moving the spiders 34—36 and turning the related shutter groups to desired positions. The arms 64 and cups 65 are conveniently grouped for simultaneous digital operation. In order to maintain the arms 64, and hence the collars, spiders, and shutters, in their adjusted positions, washers may be provided for cooperation with lock nuts 67 on shafts 62 to frictionally hold the arms 64 against accidental movement from adjusted position.

A housing 70 fixed to frame 10 encloses the color screen and is provided in its front and rear walls with suitably located apertures 71, 72 permitting light to be transmitted through the differently colored transparencies 21 as they are rapidly rotated past the openings and intercept a beam of light from a suitable projector with which the screen is associated. The color screen and projector may be independently mounted on suitable standards but as shown I provide a plate 74 secured to housing 70 and frame 10 adapted to be slidably fitted between channels on the front of the projector above and below its light opening for supporting the color screen thereon. Plate 74 is of course apertured in the portion thereof alined with the housing opening 71, 72 and the light projecting opening or lens of the projector.

When the color screen is rotated by motor 52, glass 21 of different colors successively and repeatedly interrupt the beam of light passing from the projector through the openings 71, 72 in housing 70. Motor 52 preferably drives the color screen at such a speed that light rays of a particular color are replaced by light rays of another color before the rays of any color have time to create a fixed color sensation on the retina. As a consequence, the light rays of different color are reflected from the illuminated object and superimposed upon each other on the retina so that there is a blending of the light rays. By selectively varying the effective light transmitting areas of the various colored glasses by means of the adjustable shutters 28, the relative proportions of different colors may be desirably regulated to produce illumination of any desired color or shade inasmuch as the glasses employed preferably correspond to the "primary colors" for color mixing by light rays. The color effect produced thus depends solely upon the imagination and skill of the operator.

It is sometimes desirable that the projected light vary in color values over a determined range rather than remain of a contant value obtained by selective positioning of the shutters of the color groups to obtain the desired blend. With the mechanism thus far described such variation in the color values of the light projected may be attained through proper adjustment of the shutter positions by manipulation of the control arms 64. This however would require not only considerable skill on the operator's part but also such rapidity and nicety in constantly effecting adjustments of the shutters for the various blending colors as to be burdensome. Consequently the following mechanism is provided in order that a constant variation in color blends or graduated variations over a color range may be mechanically effected.

Referring to Figure 4, it will be remembered that each shaft 62 operates a pinion 58 to drive a rack 54 and collar, as 42, by means of which the positions of all shutters of all groups for a particular primary color are adjusted to obtain a desired color effect. Each shaft 62 is provided with an arm 80 slotted for connection to a reciprocable pitman 81 arranged to be adjustably connected to a rotary member 82 for varying the throw of arm 80 during rotation of member 82 so that the shutters operated by rack 54 may be moved from fully opened to fully closed position or moved between intermediate positions, as determined by the connection of pitman 81 to member 82.

The rotation of member 82 is effected from any of a plurality of shafts 83, 84, 85 driven at different speeds from shaft 12 through suitable gear trains (Fig. 3). The driving connection between shafts 83—85 and member 82 is effected by means of a roller 86 carried on an arm 87 so pivoted that the roller may be swung in an arc to maintain contact with member 82 and selectively contact rollers 88, carried on the shafts 83—85 which are arranged concentrically with respect to the axis of member 82. A push rod 90 connected to roller 86 extends through wall 63 and provides a control for determining the rate of operation of member 82 and hence the rate at which the associated shutters are opened and closed, or moved between intermediate positions. Rod 90 may also be adjusted to position roller 86 so that member 82 is not driven by shafts 83—85 when non-automatic shutter operation is desired.

Similar shutter operating mechanism is provided for each set of groups of shutters, that is for those associated with collars 40 and 41 also.

By means of this mechanism, the shutters may be automatically operated to obtain practically unlimited color effects because of the provision of means for automatically operating the shutters for one primary color between different settings, for varying the rate of such operation and for independently operating shutters for other colors between the same or different positions at the same or different rates of operation.

It is to be noted that the mechanism described permits desired adjustments of all shutter groups 27 for glasses of like color simultaneously and that selective adjustments of the groups of shutters associated with glasses of different color for producing desired blends, or single primary colors, may be effected without stopping or slowing down the movement of the color screen.

It is also to be noted that inasmuch as the shutters are mounted in hub 13 and rim 17 and enclosed between the glasses 21 and 22 the shutters do not have a fan effect as a result of rotation of the color screen and hence do not cause air currents apt to disturb the nicety of their adjustments. Further, the enclosure of the rotating screen in the housing 70 eliminates objectionable air currents adjacent the screen and projector; and this may be further prevented by transparent closures for the apertures 71 and 72.

Although the glasses 22 have been mentioned by way of example as being of certain colors it is to be understood that glasses of other suitable color values may be employed. The number of glasses, their shape and proportionate size may likewise vary without departing from the spirit and scope of the invention. Further, although a rotatable color screen has been described it is obvious that other forms of movement may be adopted. And although specific elements such as gears and racks have been referred to for operating the shutters it will be apparent that many different mechanisms may be used without departure from the invention.

What I claim is:

1. In combination with a color screen having a succession of differently colored transparencies; means for moving said screen to intercept a beam of light at a speed which will cause projection of a chromatic blending of the colors of said transparencies; shutter mechanism movable with said transparencies and adjustable to determinedly regulate their light-transmitting areas; and stationary means adapted to operate said moving shutter mechanism to determinedly control the transmitting area of a transparency of a selected color so as to vary the chromatic composition of the projected color blend.

2. In combination with a color screen having a repeated succession of differently colored transparencies; means for moving said screen to intercept a beam of light at a speed which will cause projection of a chromatic blending of the repeated colors of said transparencies; shutter mechanism associated with said transparencies and adjustable to regulate their light-transmitting areas; and means to adjust said shutter mechanism to determinedly equally control the light-transmitting areas of the repeated transparencies of a selected color so as to vary the chromatic composition of the projected color blend.

3. In combination with a rotary color screen having transparent sectors of different colors; means for rotating said screen to intercept a beam of light at a speed which will cause projection of a chromatic blending of the colors of said transparent sectors; shutter mechanism rotatable with said screen and adjustable to regulate the light-transmitting areas of the differently colored sectors; and stationary means adapted to adjust said rotating shutter mechanism to determinedly control the light-transmitting area of a sector of a selected color so as to vary the chromatic composition of the projected color blend.

4. In combination with a rotary color screen having a repeated succession of differently colored sector transparencies; means for rotating said screen to intercept a beam of light at a speed which will cause projection of a chromatic blending of the colors of said repeated sector transparencies; shutter mechanism rotatable with said screen and adjustable to regulate the light-transmitting areas of the sector transparencies; and means to adjust said rotating shutter mechanism to jointly control the light-transmitting areas of the repeated sector transparencies of a selected color so as to vary the chromatic composition of the projected color blend.

5. In combination with a color screen having a succession of differently colored transparencies; means for serially moving said transparencies to intercept a beam of light at a speed which will cause projection of a chromatic blending of the colors of said transparencies; shutter mechanism associated with said transparencies and adjustable to regulate their light-transmitting areas so as to change the chromatic composition of the projected color blend; means for continuously operating said shutter mechanism so as to effect a continually changing adjustment of the light-transmitting regulation of a transparency of a selected color; and a variable speed control means associated with said shutter operating means for selectively determining the rate of change in said shutter adjustment.

6. A chromatic color regulating screen comprising, a casing having spaced apertures alinable with a beam of light, a pair of spaced discs respectively of clear transparency and of sectors of different colors mounted for joint rotation within said casing, means for rotating said discs past said casing apertures to intercept the beam of light at a speed which will cause projection of a chromatic blending of the colors of said transparent sectors, shutter mechanism between said discs rotatable therewith and adjustable to determinedly regulate the light-transmitting area of a transparent sector of a selected color so as to vary the chromatic composition of the projected color blend, and means for controlling the adjustment of said rotating shutter mechanism.

7. A chromatic color-regulating screen comprising, a hub and rim, and spaced end-closing members respectively of a clear transparency, and of sectors of differently colored transparencies, said end-closing members defining an air-enclosing chamber between said rim and hub; shutters within said chamber adjustable to control the light-transmitting area of a sector transparency of a given color; means to rotate said wheel to cause said colored transparencies to intercept a beam of light at a speed which will cause said colored transparencies to project a chromatic blending of their colors; and means outside said chamber for controlling said shutter adjustments.

8. A chromatic color-regulating screen comprising, a hub and rim, and spaced end-closing members respectively of a clear transparency, and of sectors of differently colored transparencies, said end-closing members defining an air-enclosing chamber between said rim and hub; a plurality of radially disposed shutters within said chamber pivotally mounted in said hub and rim and adjustable to control the light-transmitting area of a selected sector of said wheel; means to rotate said wheel to cause said colored transparencies to intercept a beam of light at a speed which will cause said colored transparencies to project a chromatic blending of their colors; and means outside said chamber for controlling the pivotal adjustments of said shutters.

9. A chromatic color regulating screen comprising, a casing mounting a rotatable shaft and having spaced apertures alined in parallel relation to said shaft; a shaft-carried wheel comprising a hollow hub, a fixedly spaced rim, an end-closing member of clear transparency at one edge of said rim, an end-closing member at the opposite edge of said rim having transparent sectors of different colors; a plurality of radially disposed shutters pivotally mounted in said hub and said rim between said end-closing members and adjustable in related groups to control the light-transmitting areas of selected sectors of said wheel; shutter-controlling extensions for each group within said hub; operating means for said extensions mounted on said shaft and movable to adjust the shutters of a selected group; indicating means outside said casing for determinedly moving said shutter operating means; and means to rotate said wheels to cause its colored transparencies to pass between said spaced casing apertures.

10. A chromatic color regulating screen comprising, a casing mounting a rotatable shaft and having spaced apertures alined in parallel relation to said shaft; a shaft-carried wheel comprising a hollow hub, a fixedly spaced rim, an end-closing member of clear transparency at one edge of said rim, an end-closing member at the opposite edge of said rim having transparent sectors of different colors; a plurality of radially disposed shutters pivotally mounted in said hub said rim between said end-closing members and adjustable in related groups to control the light-transmitting areas of selected sectors of said wheel; shutter-controlling extensions for each group within said hub; operating means for said extensions mounted on said shaft and movable to adjust the shutters of a selected group; manual indicating means outside said casing for determinedly moving said shutter operating means; a variable feed drive mechanism on said shaft; selective means for connecting said drive mechanism to continuously move said shutter operating means and to regulate the rate of such movement; and means to rotate said wheel to cause its colored transparencies to pass between said spaced casing apertures.

11. In combination with a color screen having a succession of differently colored transparencies; means for moving said screen to intercept a beam of light at a speed which will cause projection of a chromatic blending of the colors of said transparencies; adjustable shutter mechanism for regulating the light transmitting area of certain selected transparencies of said succession, and means operable during movement of said screen to adjust the shutter mechanism for a transparency of a selected color so as to vary the chromatic composition of the projected color blend.

12. In combination with a color screen having a succession of differently colored transparencies; means for moving said screen to intercept a beam of light at a speed which will cause projection of a chromatic blending of the colors of said transparencies; shutter mechanism associated with said transparencies and adjustable to regulate the light transmitting area of certain selected transparencies of said succession; and means operable during movement of said screen to adjust said shutter mechanism for a transparency of a selected color so as to change the chromatic composition of the projected color blend.

13. In combination with a color screen having a succession of differently colored transparencies; means for moving said screen to intercept a beam of light at a speed which will cause projection of a chromatic blending of the colors of said transparencies; shutter mechanism movable with said transparencies and adjustable to regulate the light transmitting area of certain selected transparencies of said succession; and means operable during movement of said screen to adjust the shutter mechanism for a transparency of a selected color so as to change the chromatic composition of the projected color blend.

14. In combination with a color screen having a succession of differently colored transparencies; means for moving said screen to intercept a beam of light at a speed which will cause projection of a chromatic blending of the colors of said transparencies; shutter mechanism movable with said transparencies and adjustable to regulate the light transmitting area of certain selected transparencies of said succession; and means to adjust the shutter mechanism for one transparency of a selected color during movement of said mechanism with said transparencies so as to change the chromatic composition of the projected color blend.

15. In combination with a rotary color screen having transparent sectors of different colors; means for rotating said screen to intercept a beam of light at a speed which will cause projection of a chromatic blending of the colors of said transparent sectors; adjustable shutter mechanism for regulating the light transmitting area of certain selected transparent sectors; and means operable during rotation of said screen to adjust the shutter mechanism for a sector of a selected color so as to vary the chromatic composition of the projected color blend.

16. In combination with a color screen having a succession of differently colored transparencies; means for serially moving said transparencies to intercept a beam of light at a speed which will cause projection of a chromatic blending of the colors of said transparencies; shutter mechanism associated with said transparencies and adjustable to regulate the light transmitting area of certain selected transparencies of said succession; means to adjust the shutter mechanism for a transparency of a selected color so as to change the chromatic composition of the projected color blend; and means for continuously adjusting the shutter mechanism for said selected color transparencies so as to effect a continual changing of the projected color.

17. A chromatic color regulating screen comprising, a casing having spaced apertures alineable with a beam of light, a disc having transparent sectors of different colors mounted for rotating within said casing, means for rotating said transparencies past said casing apertures to intercept the beam of light at a speed which will cause projection of a chromatic blending of the colors of said transparencies, shutter mechanism rotatable at synchronous speed with said disc and sectionally adjustable to regulate the light transmitting area of certain selected transparent sectors, means to adjust a sector of said shutter mechanism regulating the light transmission of a transparency of a selected color so as to vary the chromatic composition of the projected color blend, and means to operate said shutter sector adjusting means during its rotation with said disc.

18. In combination with a color screen formed of successive units of transparencies of different colors, and a source of light having a beam projectable through said screen, means for relatively moving said screen and light beam at a speed to project a color beam formed of the chromatic blending of the different color units, sectional shutter mechanism for the separate transparent units adapted to vary between opaque and full transparency the light transmitting area of selected units, and means to operate a shutter section controlling a transparent unit of a selected color so as to vary the chromatic composition of the projected color blend.

19. In combination with a color screen formed of successive units of transparencies of different colors, a source of light having a beam projectable through said screen, and means for relatively moving said screen and light beam at a speed to project a color beam formed of the chromatic blending of the different color units, of a shutter mechanism for intercepting said beam, and means operable during relative movement of said screen and light to synchronize said beam interruption with the relative movement across the beam of a transparent unit of a selected color so as to vary the chromatic composition of the projected color beam.

20. In combination with a color screen formed of successive units of transparencies of different colors, a source of light having a beam projectable through said screen, and means for relatively moving said screen and light beam at a speed to project a color beam formed of the chromatic blending of the different color units, of a shutter mechanism movable across said beam to interrupt its projection, and means operable during relative movement of said screen and light to synchronize said shutter movement with the relative movement across the beam of a transparent unit of a selected color so as to vary the chromatic composition of the projected color beam.

21. In combination with a color screen formed of successive units of transparencies of different colors, a source of light having a beam projectable through said screen, and means for relatively moving said screen and light beam at a speed to project a color beam formed of the chromatic blending of the different color units, of an adjustable shutter mechanism movable across said beam to variedly interrupt its projection, means to synchronize said shutter movement with the relative movement across the beam of a transparent unit of a selected color so as to vary the chromatic composition of the projected color beam, and shutter adjusting means adapted to vary the beam interruption during passage across the same of said selected color transparent unit.

RICHARD W. EARLE.